(12) United States Patent
Otsuka et al.

(10) Patent No.: US 7,354,117 B2
(45) Date of Patent: Apr. 8, 2008

(54) LIQUID PRESSURE CONTROL UNIT

(75) Inventors: Yukinori Otsuka, Kanagawa (JP); Kouji Numakura, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/948,191

(22) Filed: Sep. 24, 2004

(65) Prior Publication Data

US 2005/0088040 A1    Apr. 28, 2005

(30) Foreign Application Priority Data

Oct. 22, 2003    (JP)    ............... 2003-361373

(51) Int. Cl.
*B60T 8/40* (2006.01)
(52) U.S. Cl. ............... 303/116.4; 303/119.3; 303/DIG. 10
(58) Field of Classification Search ............. 303/116.4, 303/DIG. 10, 119.3, 119.2; 417/10, 415, 417/440, 424.1, 423.14, 410.1, 417, 360, 417/363; 439/675, 744, 299; 310/71, 88, 310/91
See application file for complete search history.

(56) References Cited

U.S. PATENT DOCUMENTS

| | | | | |
|---|---|---|---|---|
| 4,684,200 A | * | 8/1987 | Capp | 439/387 |
| 5,449,226 A | | 9/1995 | Fujita et al. | |
| 6,059,381 A | * | 5/2000 | Bayer | 303/119.3 |
| 6,132,011 A | * | 10/2000 | Iwamura et al. | 303/116.4 |
| 6,224,169 B1 | * | 5/2001 | Aoki et al. | 303/116.4 |
| 6,241,489 B1 | * | 6/2001 | Lewin et al. | 417/410.1 |
| 6,244,671 B1 | * | 6/2001 | Tamai | 303/119.3 |
| 6,550,873 B1 | * | 4/2003 | Hengler et al. | 303/119.3 |
| 6,616,248 B2 | * | 9/2003 | Obuse et al. | 303/119.3 |

FOREIGN PATENT DOCUMENTS

JP    6-122364 A    5/1994

* cited by examiner

*Primary Examiner*—Bradley King
*Assistant Examiner*—Mariano Sy
(74) *Attorney, Agent, or Firm*—Foley & Lardner LLP

(57) ABSTRACT

In a liquid pressure control unit, a positive terminal of a power supply block is connected to a positive terminal of a motor block through a penetrating hole of a pump block. The power supply block is connected with the pump block, which serves as a power supply passage, via opposed male and female negative connectors. The female connector is connected to the male connector in the same direction as a direction in which the power supply block is connected to the pump block.

18 Claims, 4 Drawing Sheets

LIQUID PRESSURE CONTROL UNIT

BACKGROUND OF THE INVENTION

1. Field of the Invention

The present invention relates to a liquid pressure control unit used for a vehicular anti-lock brake apparatus.

2. Description of the Related Art

One of various kinds of the vehicular anti-lock brake apparatuses is constituted by a single liquid pressure control unit in which an electric motor to drive a pump, a flow passage control purpose electromagnetic valve, a power supply equipment to cause a current to flow into the electric motor are integrally assembled to a pump block into which a pump to suck a brake liquid is incorporated (built), as disclosed in a Japanese Patent Application First Publication No. Heisei 6-122364 published on May 6, 1994 (which corresponds to a U.S. Pat. No. 5,449,226 issued on Sep. 12, 1995). This previously proposed liquid pressure control unit is constituted by a pump block formed of a metal having an electric conductivity such as made of an aluminum alloy material and on an internal of which a pump or an electromagnetic valve is housed, a motor block attached on one side surface of the pump block and in which an electric motor is incorporated, and a power supply block attached onto the other side of the pump block and into which an electronic controller to control a current flow through the motor is housed. Then, positive (pole) portions of the power supply block and the motor block are interconnected together via a penetrating hole formed on a pump housing. On the other hand, negative (pole) portions of both of the power supply block and the motor block are interconnected via the pump housing as a power supply passage. The negative pole portion of the power supply block and the negative pole portion of the motor block are connected by means of a screwing.

In the above-described previously proposed liquid pressure control unit, both of the negative pole portions of the power supply block and of the motor block are connected to the pump block by means of the screwing, respectively. However, this screwing is carried out onto the pump block from both insides of the power supply block and the motor block. Hence, with an opening for the screwing previously formed on each of the power supply block and the motor block, the screwing of the negative pole portions is carried out through each opening during the mutual coupling of each block. It is, at a final stage of assembly, necessary to cover each opening with a lid. Therefore, it becomes difficult to assembly these respective blocks into the liquid pressure control unit. In addition, once the negative pole portions are fixed to the corresponding blocks, it becomes difficult to disassemble again during a replacement of terminals. Hence, if the blocks are forcibly disassembled, a breakage or a deformation thereof becomes easy to occur. It, then, becomes difficult to reuse the liquid pressure control unit described above.

SUMMARY OF THE INVENTION

It is, hence, an object of the present invention to provide a liquid pressure control unit which is capable of improving an easiness in uniting each block into one liquid pressure control unit.

The above-described object can be achieved by providing a liquid pressure control unit, comprising: a pump block into which a pump to generate a liquid pressure is incorporated and having an electric conductivity; a motor block attached onto one side surface of the pump block and into which an electric motor to drive the pump is incorporated; and a power supply block attached onto the other side surface of the pump block and through which an electric current is caused to flow into the electric motor of the motor block, a positive terminal of the power supply block being connected to a positive terminal of the motor block through a penetrating hole of the pump block and negative terminals of the power supply block and of the motor block being connected with the pump block which is a power supply passage and male and female connectors at a negative side being opposed together between the power supply block and the pump block, and the female connector being connected to the male connector in the same direction as attaching of the power supply block onto the pump block.

The above-described object can also be achieved by providing a method applicable for a liquid pressure control unit, comprising: providing a pump block into which a pump to generate a liquid pressure is incorporated and having an electric conductivity; providing a motor block attached onto one side surface of the pump block and into which an electric motor to drive the pump is incorporated; and providing a power supply block attached onto the other side surface of the pump block and through which an electric current is caused to flow into the electric motor of the motor block, a positive terminal of the power supply block being connected to a positive terminal of the motor block through a penetrating hole of the pump block and negative terminals of the power supply block and of the motor block being connected with the pump block which is a power supply passage and male and female connectors at a negative side being opposed together between the power supply block and the pump block, and the female connector being connected to the male connector in the same direction as attaching of the power supply block onto the pump block.

This summary of the invention does not necessarily describe all necessary features so that the present invention may also be sub-combination of these described features.

DETAILED DESCRIPTION OF THE PREFERRED EMBODIMENTS

Reference will hereinafter be made to the drawings in order to facilitate a better understanding of the present invention. It is noted that a liquid pressure control unit in each of preferred embodiments is used in a vehicular antilock brake apparatus.

Figure 1:
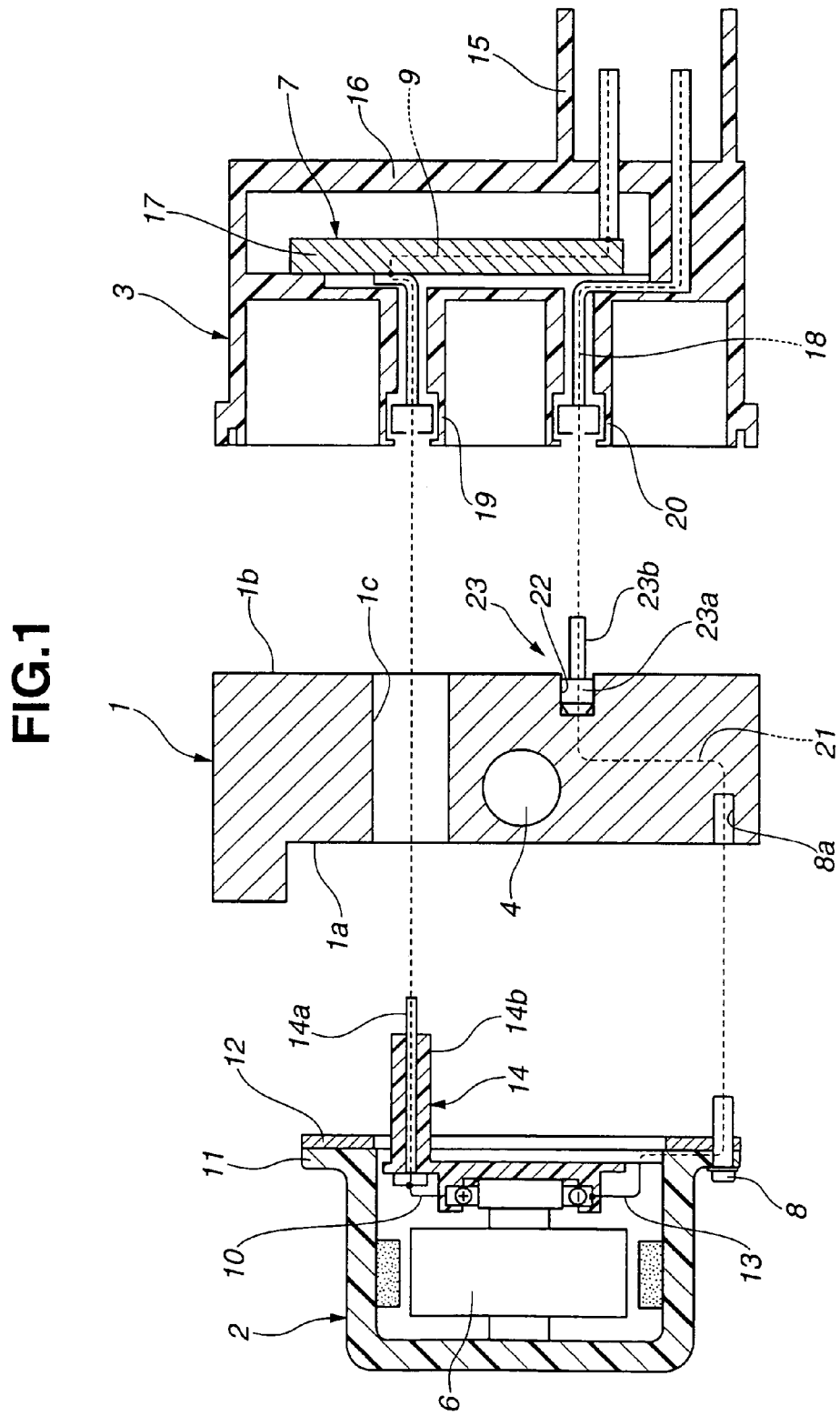
FIG. 1 is an exploded cross sectional view of each of blocks applicable to a liquid pressure control unit in a first preferred embodiment according to the present invention.
Figure 2:
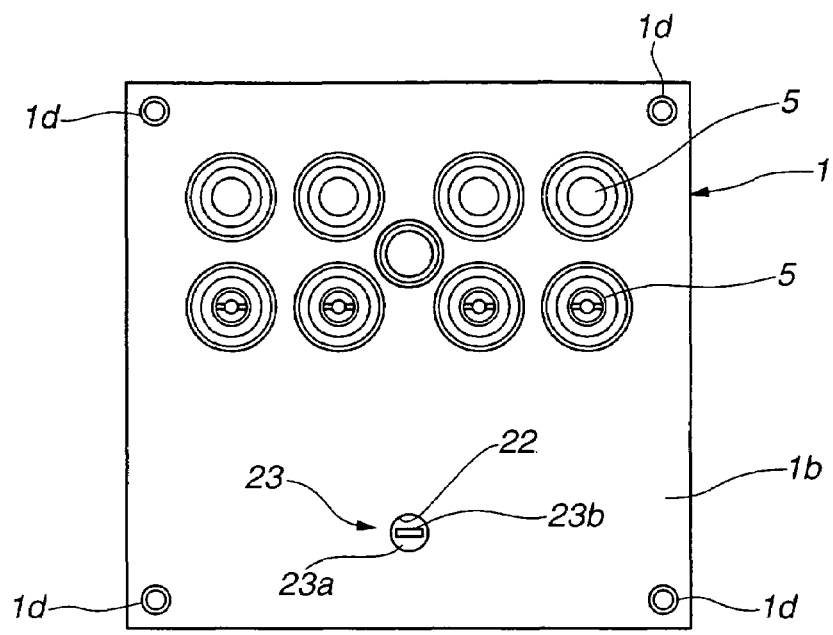
FIG. 2 is a front view of a pump block of the liquid pressure control unit in the first preferred embodiment according to the present invention shown in FIG. 1.
Figure 3:
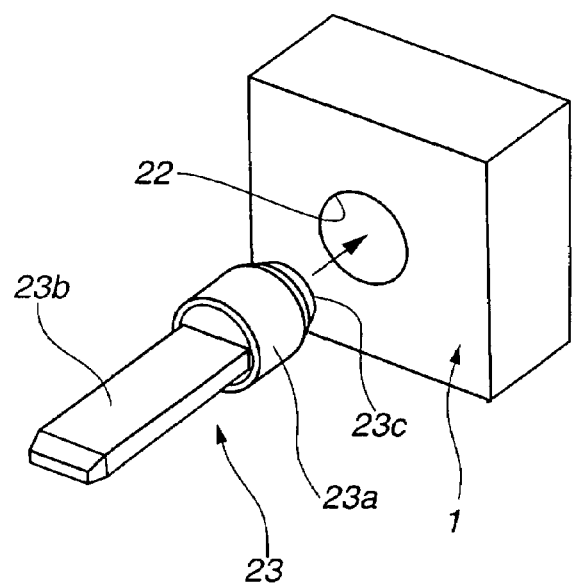
FIG. 3 is a perspective view representing a fixation operation of a negative connector to the pump block of the liquid pressure control unit in the first preferred embodiment shown in FIG. 1.
Figure 4:
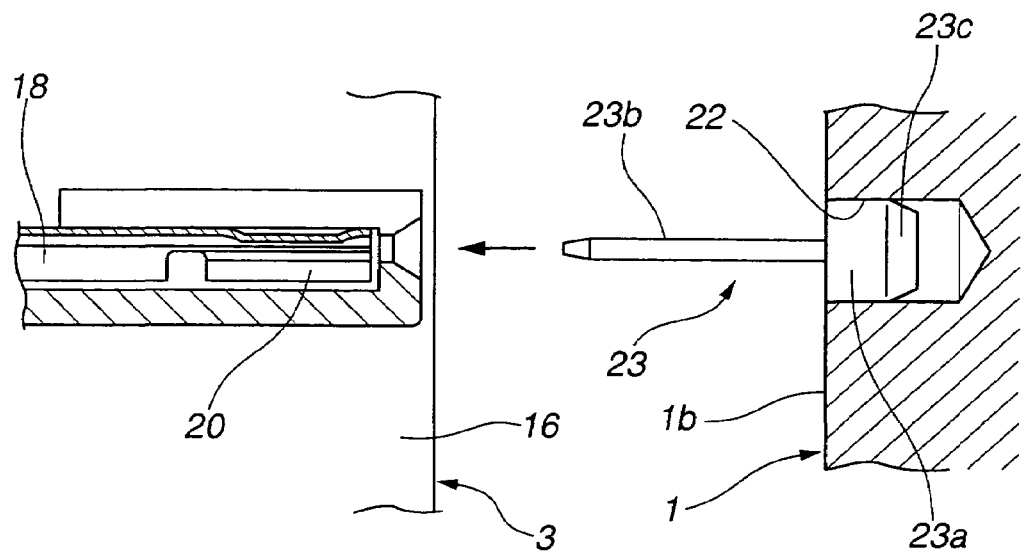
FIG. 4 is a partially cross sectional view representing that the negative (side) male and female connectors of the pump block with a power supply block are inserted into a socket placed at the power supply block.

FIG. 1 shows a cross sectional view of the liquid pressure control unit in the first embodiment with each block disassembled. FIG. 2 shows a front view of a pump block of the liquid pressure control unit in the first embodiment as viewed from one side surface $1b$ of pump block 1. FIG. 3 shows a perspective view representing a state in which a negative (side) male connector is fixed to pump block 1 of the liquid pressure control unit in the first embodiment. FIG. 4 shows a cross sectional view representing a state in which the negative connector of the pump block is inserted into a socket of a power supply block of the liquid pressure control unit in the first embodiment. The liquid pressure control unit in the first embodiment is, as shown in FIGS. 1 and 2, constituted by: (a) a pump block 1 into which a pump 4 (for returning a brake liquid of a reservoir during a pressure decrease control to a master cylinder) and a plurality of pressure increase and decrease electromagnetic valves 5 are incorporated, (b) a motor block 2 attached onto one side surface $1a$ of pump block 1 and into which an electric motor 6 to drive pump 4 is incorporated, and (c) a power supply block 3 attached onto the other side surface $1b$ of pump block 1 and into which an electronic controller 7 that controls a current flowing into the electric motor 6 is incorporated.

The pump block 1 is formed in a substantially quadrate shape, is made of an aluminum alloy material which is a metal having an electric conductivity. The pump block 1 is attached to the motor block 2 via its side surface $1a$ by means of an electrically conductive metal screw 8, which is threaded into a hole $8a$. The power supply block 3 is attached to the other side surface $1b$ of pump block 1 with screws (not shown) that are threaded through holes $1d$. In addition, the pump block 1 is formed with a penetrating hole $1c$ opened to one side surface $1a$ and to the other side surface $1b$. Positive portions 9 (dotted line in FIG. 1) and positive wire 10 of motor block 2 and power supply block 3 are connected together from an axial direction of each block via penetrating hole $1c$.

Motor block 2 is formed with a junction flange 11 made of an electrically conductive metallic material at an end portion of pump block 1. Junction flange 11 is screwed to pump block 1 via a seal plate 12 by means of screw 8. A negative wire terminal 13 of electric motor 6 is connected with junction flange 11. Hence, negative wire terminal 13 of motor block 6 is electrically connected to electrically conductive pump block 1 via metallic screw 8. In addition, positive wire 10 of electric motor 6 constitutes a male connector together with a flat plate-like terminal pin $14a$ whose positive (male) connector 14 is projected axially in a direction of pump block 1 from an end surface of motor block 2 and an electrically insulative resin sleeve $14b$ covering terminal pin $14a$ except its tip end portion of terminal $14a$ and is inserted within penetrating hole $1c$ of pump block 1. On the other hand, a control printed circuit board 17 of electronic controller 7 is assembled onto power supply block 3 within a casing 16 constituted by an electrically insulative resin having an external connector portion 15 at the rear end portion of power supply block 3. Positive line 9 and negative terminal 18 are axially extended through external connector portion 15 in a direction of pump block 1. A surrounding of positive portions 9 of power supply block 3 is covered with an insulative resin material of a casing 16. A female socket 19 is installed at a tip of power supply block 3 to receive positive wire terminal 10 located at motor block 3. Negative terminal 18 of power supply block 3 is disposed in parallel to positive line 9 within an inside of casing 16, as shown in FIGS. 1 and 4. The surrounding of negative terminal 18 is covered with a resin material of casing 16 and a female socket (or negative terminal connector) 20 is disposed to receive a negative connector (male connector) 23 (specifically, flat terminal pin $23b$) of pump block 1.

On the other hand, the male connector 23 is held within a holding hole (or recess portion) 22 which is concave shape in cross section and is formed toward a direction (axial direction) of power supply block 3 at a position of another side surface $1b$ of pump block 1 opposed against female socket 20 of power supply block 3, as shown in FIGS. 1 through 4.

Male connector 23 is provided with a terminal portion $23a$ fixed under pressure into holding hole 22 and a terminal pin $23b$ whose base end is integrally buried within an inside of terminal portion $23a$ in the axial direction of terminal portion $23a$. Terminal portion $23a$ is cylindrically formed with a brass metallic material and is formed substantially in a circular cone tapered shape to provide a guide when a tapered end $23c$ faced at holding hole 22 side is inserted under pressure (press fitted) into holding hole 22. On the other hand, terminal pin $23b$ is formed in an elongated plate shape with a pressed nut formed by means of a press forming. A tip projected from terminal portion $23a$ is oriented toward female socket 20 of power block 3. In addition, terminal pin $23b$ is set and arranged in substantially lateral direction (horizontal direction) with respect to the other side surface $1b$ of pump block 1 (as viewed from the other side surface $1b$ of the pump block 1 (refer to FIG. 2)).

Terminal portion $23a$ is inserted under pressure (press fitted) and fixed into a wall of holding hole 22 from the axial direction via tapered end $23c$ from the axial direction by means of a predetermined jig before assembling each block 1, 2, and 3 of the liquid pressure control unit into one body.

Hence, to assemble respective blocks 1 through 3, as shown in FIG. 1, at first, motor block 2 is disposed at one side surface $1a$ of pump block 1 as shown in FIG. 1 and positive connector 14 of motor block 2 is inserted into penetrating hole $1c$ of pump block 1 together with resin sleeve $14b$. In this state, junction flange 11 of motor block 2 is tightened to pump block 1 by means of screw 8. At this time, negative wire terminal 13 of electric motor 6 is electrically connected to pump block 1 by means of screw 8. Thereafter, power supply block 3 is disposed at the other side surface of pump block 1. Then, when pump block 1 and power supply block 3 are mutually approached to each other from the axial direction, positive terminal pin (flat plate-like terminal pin) $14a$ projected from penetrating hole $1c$ of pump block 1 toward the other side surface $1b$ is inserted and press fitted into positive connector 19 of power supply block 3 so that positive wire (terminal) 10 of motor block 2 is electrically connected to positive terminal 19 (female socket).

At the same time, negative terminal pin $23b$ of pump block 1 is pressed and inserted into negative terminal connector (female socket) 20 from the axial direction so that negative terminal pin $23b$ is electrically connected to negative connector 20. Thereafter, when casing 16 of power supply block 3 is attached to the other side surface $1b$ of pump block 1 by means of screwing, a whole assemble of each block 1 through 3 has been completed.

As described above, in the case of the liquid pressure control unit in the first embodiment, with power supply block 3 and pump block 1 approached to each other from the axial direction, a screw tightening can connect negative male connector 23 of pump block 1 to negative terminal 18 of power supply block 3 from the axial direction. Hence, a connecting operation (working) of negative terminal 18 becomes remarkably easy. Consequently, the assemble operation of each block 1 through 3 becomes easy.

In addition, since female socket 20 at negative terminal sides 18 and 21 is connected to male socket 23 from the axial direction, a size tolerance of each block in the axial direction can easily be absorbed. On the other hand, for positive line sides 9 and 10, positive connector 14 of motor block 2 is simply jammed into female socket 19 of power supply block 3 via penetrating hole 1c so as to connect each other. The connecting operation becomes easy. In addition, during a maintenance operation, as reversed to the assembly operation, with screws of power supply block 3 and motor block 2 to pump block 1 removed, respective connectors 14 and 23 are simply extracted from each socket 19 and 20 for positive line 9 and positive wire terminal 10 and for negative terminal 18 and negative line (path) 21. Thus, each block can easily be disassembled. Hence, if a failure occurs in accommodated parts within any one of the three blocks, only respective parts of the corresponding block in which the parts failed can easily be replaced. Since penetrating hole 1c may be formed on pump block 1 by a number corresponding to the number of positive terminals, a small sizing of the unit can be achieved.

Since terminal portion 23a of male connector 23 is inserted (press fitted) into holding hole 22 under pressure to fix male connector terminal portion 23a to pump block 1, it becomes unnecessary to use other parts to fix terminal portion 23a to pump block 1. Hence, the cost becomes reduced. Since terminal pin 23b of male connector 23 is formed in the flat plate-like shape, the flat plate-like shaped terminal pin 23b can serve to position power supply block 3 with respect to pump block 1 in a radial direction of each of pump block 1 and power supply block 3 when power supply block 3 and pump block 1 are assembled to each other. Thus, a positioning accuracy in the radial direction is improved so that a reliability of the electrical connection of male connector 23 to female socket 20 is improved. In addition, an erroneous assembly between power supply block 3 and pump socket 1 during the assembly between power supply block 3 and pump block 1 can be prevented.

Terminal pin 23b is formed by means of a forging. Hence, the forming of terminal pin 23b becomes easy. The working time can be shortened and a reduction of its manufacturing cost can be achieved.

A contact area between an outer peripheral surface of negative terminal portion 23a and an inner peripheral surface of holding hole 22 is set to be larger than the contact area between terminal pin 23b and female socket 20. Hence, a reduction of the electric conductivity within pump block 1 having a large electrical resistance can be prevented.

Figure 5:
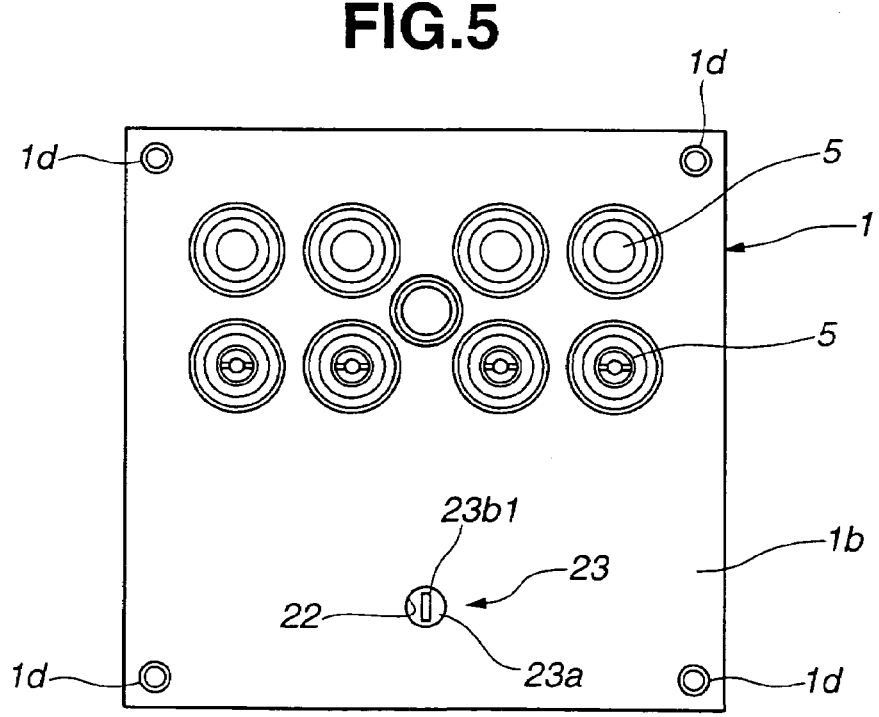
FIG. 5 is a front view of the pump block applicable to the liquid pressure control unit in a second preferred embodiment according to the present invention.
Figure 6:
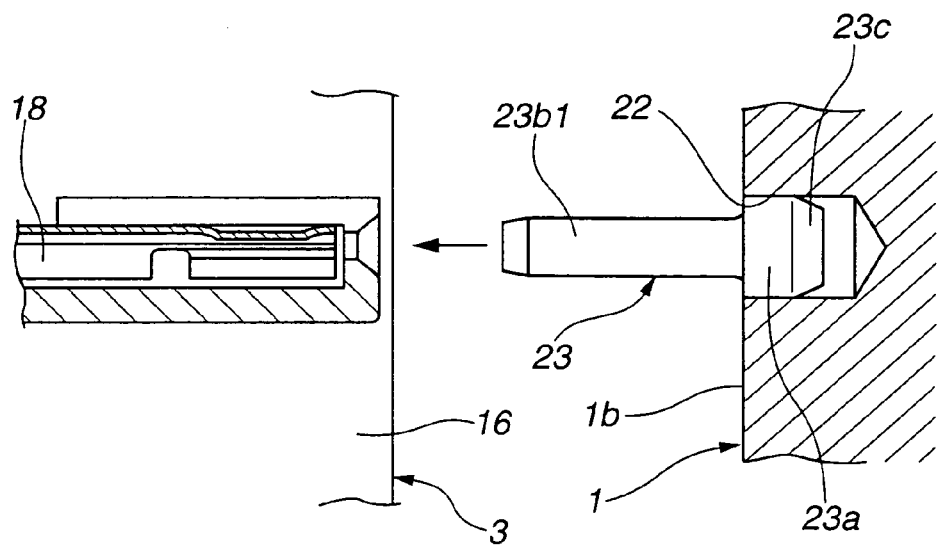
FIG. 6 is a partially cross sectional view representing a state in which the negative (side) connector of the pump block is inserted into the socket of a power supply block in the liquid pressure control unit in the second preferred embodiment according to the present invention.

FIGS. 5 and 6 show partial views of the liquid pressure control unit in a second preferred embodiment according to the present invention. A basic structure of liquid pressure control unit in the second embodiment is generally the same as in the case of the first embodiment. However, in the second embodiment, a cross section of terminal pin 23b1 of pump block 1 is formed in a longitudinally elongate direction with respect to the other side surface 1b of pump block 1 as viewed from shown in FIGS. 5 and 6. Hence, the same advantages as described in the first embodiment can be achieved in the first embodiment.

Figure 7:
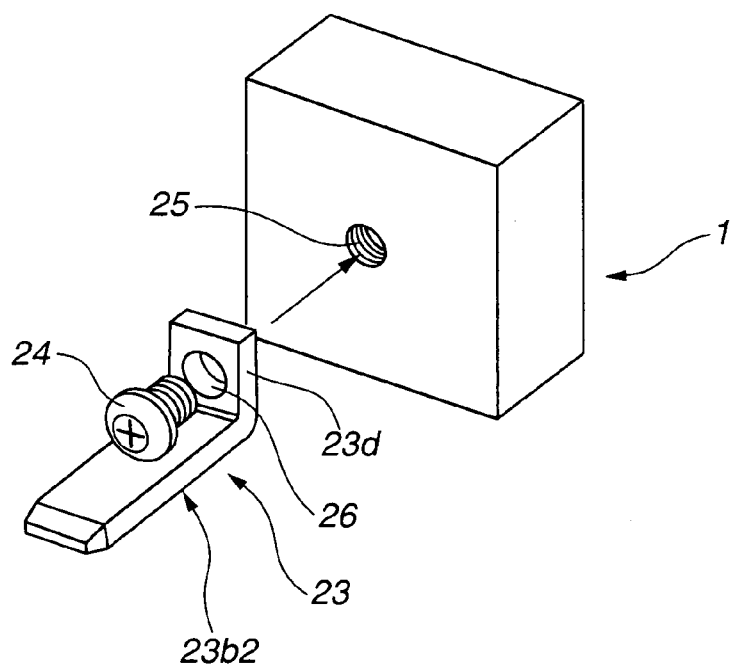
FIG. 7 is a perspective view representing a state in which a new negative (side) male connector is fixed to the pump block of the liquid pressure control unit in a third preferred embodiment according to the present invention.

FIG. 7 shows a third embodiment of the liquid pressure control unit. The basic structure of the third embodiment is generally the same as that of the first embodiment. However, in the third embodiment, terminal pin 23b2 is fixed to pump block 1 by means of a threaded screw 24 and threaded hole 25. In details, threaded hole 25 is formed onto the other side surface 1b of pump block 1. Terminal pin 23b2 in the flat plate-like shape has its basic end portion 23d bent substantially through a right angle to form an letter L shape. In addition, a basic end portion 23d is provided with a penetrating hole 26 is formed on the basic end portion 23d. Hence, in the third embodiment, since terminal pin 23b is directly fixed by means of threaded screw 24 with respect to pump block 1, the fixing operation of terminal pin 23b becomes easy.

The present invention is not limited to each of the first, second, and third embodiment. Terminal pin 23b may be fixed to pump block 1 by means of, for example, a caulking which is easy to carry out a fixation operation. In addition, negative connector (male connector) 23 of pump block 1 and negative connector (female socket) 20 of power supply block 3 may be formed in such an opposite side that negative connector (male connector) 23 is formed on power supply block 3 and female socket (negative terminal connector) 20 is formed on pump block 1. Furthermore, the liquid pressure control unit may be applied to any other equipment than the anti-lock brake apparatus. It is noted that a reference sign 1c denotes a threaded hole and the dot lines shown in FIG. 1 denote path of positive electrical potential and path of negative electrical potential.

The entire contents of a Japanese Patent Application No. 2003-361373 (filed in Japan on Oct. 22, 2003) are herein incorporated by reference. The scope of the invention is defined with reference to the following claims.

What is claimed is:
1. A liquid pressure control unit, comprising:
 a pump block in which a pump to generate a liquid pressure is incorporated, wherein the pump block is conductive;
 a motor block attached to a first side surface of the pump block, wherein an electric motor to drive the pump is incorporated in the motor block; and
 a power supply block attached to a second side surface of the pump block,
 wherein the power supply block is configured to cause an electric current to flow through the pump block and into the electric motor of the motor block,
 wherein a positive terminal of the power supply block is connected to a positive terminal of the motor block through a penetrating hole in the pump block,
 wherein negative terminals of the power supply block and of the motor block are connected to each other via the conductive pump block which is configured to serve as a power supply passage, and
 wherein both of opposed negative male and female connectors of the power supply block and the pump block and opposed positive male and female connectors of the motor block and the power supply block are slidingly connected in the same direction as a direction in which the power supply block is connected to the pump block.

2. A liquid pressure control unit, comprising:
a pump block in which a pump to generate a liquid pressure is incorporated, wherein the pump block is conductive;
a motor block attached to a first side surface of the pump block, wherein an electric motor to drive the pump is incorporated in the motor block; and
a power supply block attached to a second side surface of the pump block,
wherein the power supply block is configured to cause an electric current to flow through the pump block and into the electric motor of the motor block,
wherein a positive terminal of the power supply block is connected to a positive terminal of the motor block through a penetrating hole in the pump block,
wherein negative terminals of the power supply block and of the motor block are connected to each other via the conductive pump block which is configured to serve as a power supply passage,
wherein both of opposed negative male and female connectors of the power supply block and the pump block and opposed positive male and female connectors of the motor block and the power supply block are connected in the same direction as a direction in which the power supply block is connected to the pump block,
wherein the negative female connector is formed on the power supply block,
wherein a recess portion is formed on the pump block at a surface that opposes the negative female connector,
wherein a terminal portion of the negative male connector is press fitted into the recess portion, and
wherein a male terminal pin disposed on a tip of the terminal portion is inserted into a female socket of the female connector.

3. A liquid pressure control unit as claimed in claim 1, wherein a male terminal pin of the male connector at the pump block is formed of an elongate terminal pin of a rectangular shape in cross section insertable to the female connector at the power supply block.

4. A liquid pressure control unit as claimed in claim 3, wherein the male terminal pin is elongated longitudinally as viewed from the first side surface of the pump block.

5. A liquid pressure control unit as claimed in claim 3, wherein the male terminal pin is elongated laterally as viewed from the second side surface of the pump block.

6. A liquid pressure control unit as claimed in claim 4, wherein the female connector has a recess portion whose inlet area is larger than a cross area of the male terminal pin to enable receipt of the male terminal pm in the female connector.

7. A liquid pressure control unit as claimed in claim 5, wherein a negative wire terminal of the motor block is electrically connected to the pump block via a screw.

8. A liquid pressure control unit as claimed in claim 1, wherein the male connector at the positive side is formed on the motor block and inserted into a female connector formed on the power supply block.

9. A liquid pressure control unit as claimed in claim 1, wherein a pin of the male connector at the positive side is partially covered with a resin to provide an insulation against the pump block.

10. A liquid pressure control unit as claimed in claim 2, wherein a contact area between an outer peripheral surface of the terminal portion and an inner peripheral surface of the recess of the male connector is larger than a contact area between the terminal pin and the socket.

11. A liquid pressure control unit as claimed in claim 2, wherein the terminal pin is tapered and fixed by means of a screw into the pump block.

12. A liquid pressure control unit as claimed in claim 11, wherein a threaded hole is formed on the second side surface of the pump block, wherein a basic end portion is bent in a substantially letter L shape, and wherein a penetrating hole is formed on the basic end portion through which a screw is screwed into the threaded hole.

13. A liquid pressure control unit as claimed in claim 2, wherein the terminal pin of the male connector is formed by means of a forging with a press.

14. A method applicable to a liquid pressure control unit, the method comprising:
providing a pump block in which a pump to generate a liquid pressure is incorporated, wherein the pump block is conductive;
providing a motor block attached to a first side surface of the pump block, wherein an electric motor to drive the pump is incorporated in the motor block; and
providing a power supply block attached to a second side surface of the pump block, wherein the power supply block is configured to cause an electric current to flow through the pump block and into the electric motor of the motor block, wherein a positive terminal of the power supply block is connected to a positive terminal of the motor block through a penetrating hole of the pump block, wherein negative terminals of the power supply block and of the motor block are connected to each other via the conductive pump block which is configured to serve as a power supply passage, and wherein both of opposed negative male and female connectors of the power supply block and the pump block and opposed positive male and female connectors of the motor block and the power supply block are slidingly connected in the same direction as a direction in which the power supply block is connected to the pump block.

15. A liquid pressure control unit as claimed in claim 1, wherein a male terminal pin of the negative male connector is inserted into a female socket of the negative female connector.

16. A liquid pressure control unit as claimed in claim 1, wherein the negative male connector is formed on the pump block, and wherein the negative female connector is formed on the power supply block.

17. A liquid pressure control unit as claimed in claim 2, wherein a male terminal pin of the negative male connector is inserted into a female socket of the negative female connector.

18. A liquid pressure control unit as claimed in claim 2, wherein the negative male connector is formed on the pump block, and wherein the negative female connector is formed on the power supply block.

* * * * *